B. H. SMITH.
LUBRICATING GLAND FOR STUFFING BOXES.
APPLICATION FILED DEC. 28, 1916.
1,239,132.
Patented Sept. 4, 1917.
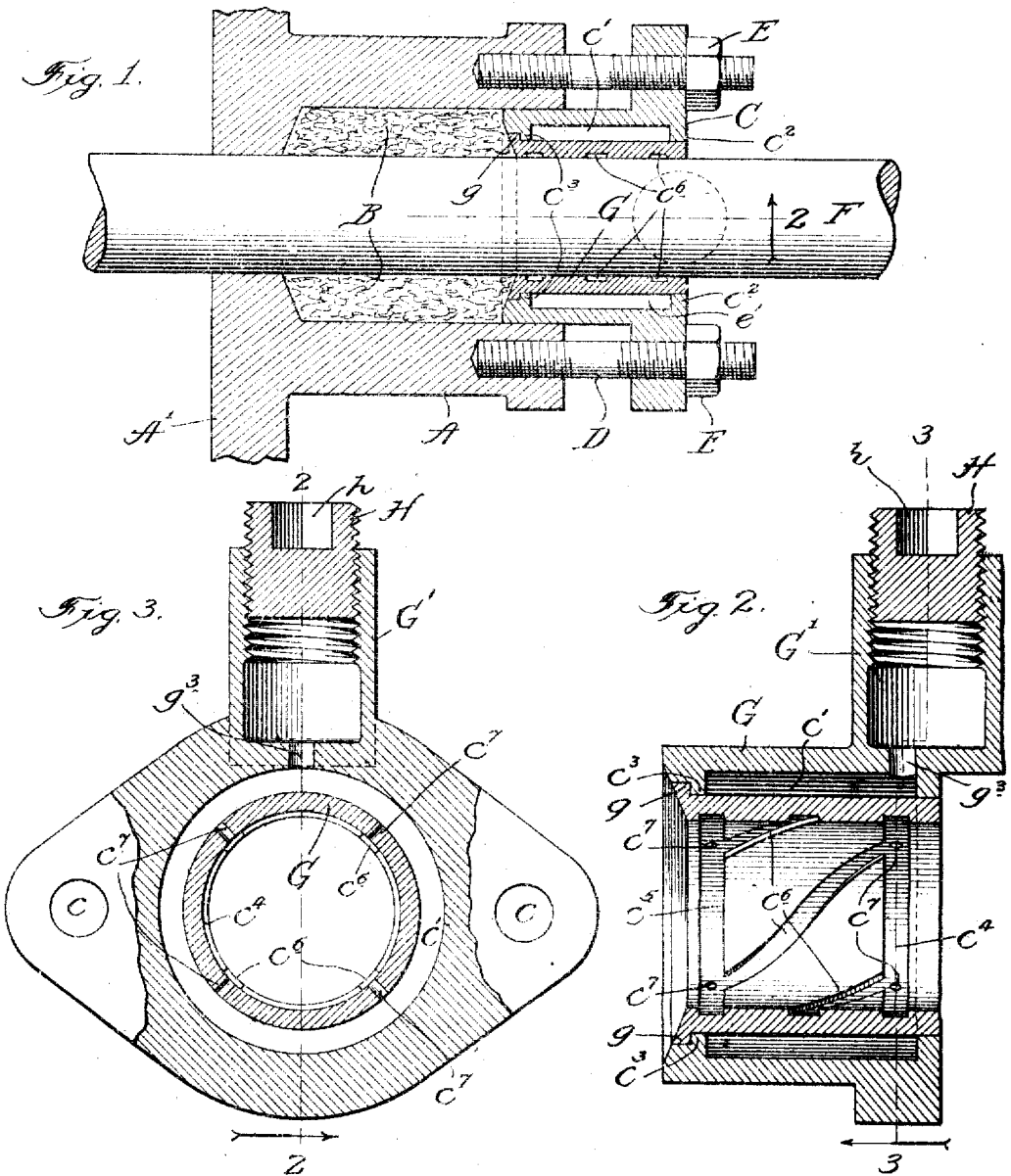
Witnesses:
Inventor:
Bert H. Smith

UNITED STATES PATENT OFFICE.

BERT H. SMITH, OF FAIRBURY, NEBRASKA, ASSIGNOR TO WILLBERT MANUFACTURING COMPANY, OF FAIRBURY, NEBRASKA, A CORPORATION.

LUBRICATING-GLAND FOR STUFFING-BOXES.

1,239,132.   Specification of Letters Patent.   Patented Sept. 4, 1917.

Application filed December 28, 1916. Serial No. 139,323.

*To all whom it may concern:*

Be it known that I, BERT H. SMITH, a citizen of the United States, residing at Fairbury, in the county of Jefferson and State of Nebraska, have invented certain new and useful Improvements in Lubricating-Glands for Stuffing-Boxes, of which I do declare the following to be a full, clear, and exact description, reference being had to the drawing accompanying this specification.

The present invention has for its object to provide a simple and effective construction of gland whereby grease may be uniformly distributed over the surface of the piston rod, and the invention consists in the novel features of construction hereinafter described, illustrated in the accompanying drawing and particularly pointed out in the claims at the end of this specification.

Figure 1 is a view in central longitudinal section through a stuffing box embodying my invention, the piston rod being shown in elevation. Fig. 2 is a sectional view on line 2—2 of Fig. 3. Fig. 3 is a view in section on line 3—3 of Fig. 2, the attaching lugs being shown in elevation.

A designates a stuffing box which is shown as projecting from the cylinder head A', this stuffing box being provided with a chamber B to receive suitable packing and to receive, at its outer end, a gland C whereby the packing is retained within the stuffing box.

From the end of the stuffing box A project the threaded bolts D that pass through holes $c$ of the ears of the gland C, these bolts D being provided with correspondingly threaded nuts E to retain the gland in position. Through the stuffing box A and gland C passes the piston rod F or other rod to be lubricated.

My improved gland C is preferably formed as a casting and has upon its interior an annular chamber $c'$ that extends from end to end of the gland, the chamber being formed by the wall of the gland and by the inwardly projecting annular ribs $c^2$ and $c^3$ at its ends and by an inner wall or bushing G that is preferably formed of relatively soft metal, such as brass or other anti-friction metal, and separate from the gland C. The lower end of the bushing G is formed with an outwardly projecting annular shoulder $g$ that engages with the inwardly projecting annular rib $c^2$ at the lower end of the gland C.

The inner face of the bushing G is formed with the annular channels $c^4$ and $c^5$ and preferably also with the connecting channels $c^6$ that are shown as diagonally disposed and curved, as is best indicated in Fig. 2 of the drawing; and through the bushing at various points around the annular channels $c^4$ and $c^5$ are formed the holes $c^7$ to admit lubricant through the bushing G from the chamber $c'$ of the gland. As shown, the gland G has formed integral therewith a grease cup G' the interior wall of which is screw threaded to receive a threaded plug H whereby the grease may be forced from the chamber G' through a hole $g^2$ into the annular chamber $c'$ of the gland, whence it will pass by the holes $c^7$ to the distributing grooves upon the inner face of the bushing G. The plug H may be formed with a socket $h$ to receive a suitable tool whereby the plug may be turned from time to time to force the grease from the cup G' into the gland.

From the foregoing description it will be seen that when my improved gland has been placed in position for use, grease may be forced from the grease cup G' into the annular chamber $c'$ of the gland and through the bushing G to the piston rod F and the arrangement of the distributing grooves upon the inner face of the bushing G will insure a uniform distribution of the grease upon the surface of the rod F. The diagonal arrangement of the groove $c^6$ of the bushing, and as well the annular grooves $c^4$ and $c^5$, insure that a film of grease is constantly delivered around the entire periphery of the rod F. Inasmuch as the bushing G is removable, it can be readily renewed when worn, it merely being necessary to remove the gland and slip the bushing from out the inner end thereof, the bushing being retained in position within the gland by the engagement of its outwardly projecting rib or shoulder $g$ with the lower end of the gland.

By forming the gland C with an annular chamber extending substantially from end to end thereof, a very large area for the distribution of grease is afforded, while the inwardly projecting annular shoulders $c^2$ and $c^3$ of the gland form a firm bearing for the bushing.

I wish it distinctly understood that while I have described what I regard as the preferred embodiment of my invention, the details of construction above set out may be varied without departing from the spirit of the invention and features of the invention may be employed without its adoption as an entirety.

Having thus described my invention, what I claim as new and desire to secure by Letters Patent is—

1. The combination with a stuffing box, of a lubricating gland extending within the outer portion of said stuffing box for holding packing in place about the rod to be lubricated, said gland having an annular chamber therein extending substantially from end to end thereof, the inner wall of said chamber being perforated to permit the passage of grease therethrough and having its inner face provided with grooves for distributing the grease from end to end of said gland, said gland having a grease cup at its outer end and a screw plug in said grease cup for forcing grease into said chamber and through said perforations into said grooves.

2. A lubricating gland adapted to fit within the outer portion of a stuffing box for holding packing in place about the rod to be lubricated, said gland having an interior annular chamber extending substantially from end to end thereof, a bushing interlocked with and adapted to be held in place by said gland, said bushing forming the inner wall of said chamber and having perforations therein for the passage of lubricant and also having lubricant distributing grooves on its inner face, said gland having means for forcing grease from said chamber and through said perforations into said grooves.

3. A lubricating gland comprising a casting having an interior annular chamber extending substantially from end to end thereof, a removable bushing forming the inner wall of said chamber and extending from end to end of said gland, said bushing having holes therein to permit lubricant to pass from the chamber of the gland to the body to be lubricated, the bushing being interlocked with said gland to hold said bushing against outward movement while leaving it free to be withdrawn from the inner end of the gland.

4. A lubricating gland comprising a casting having an interior annular chamber extending substantially from end to end thereof and provided at its opposite ends with inwardly projecting annular ribs and an interior bushing of anti-friction metal forming the inner wall of said gland, said bushing extending from end to end of the gland and inside of and engaging said annular ribs and being provided with holes to permit the passage through the bushing of lubricant from said chamber.

5. A lubricating gland having its exterior surface shaped to fit within the stuffing box of a cylinder head and having an interior annular chamber extending substantially from end to end thereof, the inner wall of said chamber being perforated to permit the passage of grease therethrough and having its inner face provided with distributing grooves at its opposite ends and with intermediate grooves connecting said distributing grooves.

6. A lubricating gland having an interior annular chamber provided at its inner end with an inwardly projecting rib, and a perforated bushing forming the inner wall of said chamber, said bushing being provided at its inner end with an outwardly projecting rib or shoulder to interlock with the inner end of said gland, said rib or shoulder engaging the outside of the projecting rib of the gland to permit the bushing to be withdrawn from the inner end of said gland.

7. The combination with a stuffing box, of a gland having its exterior shaped to set within the bore of the stuffing box, said gland being provided with an interior chamber extending substantially from end to end thereof, a lubricant receptacle connecting with said chamber, and a bushing extending from end to end of said gland and forming the inner wall of said lubricating chamber, said bushing being perforated to permit the passage of lubricant therethrough, said bushing being detachably interlocked with said gland and being removable therewith when said gland is withdrawn from the stuffing box.

8. A lubricating gland having its exterior surface shaped to set within the stuffing box of a cylinder head, said gland being provided at its outer end with laterally projecting lugs to receive attaching bolts, the interior of said gland being formed with an annular grease chamber, a bushing extending from end to end of said gland and having perforations for the passage of lubricant from said chamber to the rod to be lubricated, said gland being provided at its outer end with a grease cup for delivering grease to said chamber.

BERT H. SMITH.